US007833805B2

(12) United States Patent
Cuppoletti

(10) Patent No.: US 7,833,805 B2
(45) Date of Patent: Nov. 16, 2010

(54) SELECTIVELY PERMEABLE MEMBRANES ON POROUS SUBSTRATES

(75) Inventor: John Cuppoletti, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 706 days.

(21) Appl. No.: 11/454,569

(22) Filed: Jun. 16, 2006

(65) Prior Publication Data

US 2007/0116610 A1 May 24, 2007

Related U.S. Application Data

(63) Continuation-in-part of application No. PCT/US2005/038004, filed on Oct. 21, 2005.

(60) Provisional application No. 60/620,782, filed on Oct. 21, 2004, provisional application No. 60/691,105, filed on Jun. 16, 2005.

(51) Int. Cl.
  *C12M 1/00* (2006.01)
  *C12M 1/34* (2006.01)
  *G01N 33/543* (2006.01)
  *B32B 3/26* (2006.01)
  *B01L 99/00* (2010.01)

(52) U.S. Cl. .............. 436/518; 435/287.3; 435/289.1; 428/304.4; 422/101

(58) Field of Classification Search .............. 436/531, 436/532; 422/101
  See application file for complete search history.

(56) References Cited

U.S. PATENT DOCUMENTS 5,766,960 A * 6/1998 Cornell et al. .............. 436/501

| 6,174,908 | B1 * | 1/2001 | Gross et al. ........... 514/369 |
| 6,787,550 | B1 * | 9/2004 | Farina et al. ........ 514/254.09 |
| 2004/0097533 | A1 * | 5/2004 | Eun et al. ............... 514/279 |
| 2004/0146849 | A1 * | 7/2004 | Huang et al. ............. 435/4 |

OTHER PUBLICATIONS

Dunbar et al., J. Biol. Chem., vol. 276, Issue 32, 29617-29620, Aug. 10, 2001.*
The Journal of Biological Chemistry, Wallmark et al., vol. 262, No. 5, pp. 2077-2084, 1987.*
Pintschovius J., et al, Charge translocation by the Na+/K+-ATPase investigated on solid supported membranes; cytoplasmic cation binding and release. Biophys J 76(2): 827-836, Feb. 1999.
Pintschovius J., et al, Translocation by the NA+/K+-ATPase investigated on solid supported membranes: rapid solution exchange with a new technique. Biophys J. 76(2): 814-826, Feb. 1999.
Florin et al, Painted supported lipid membranes. Biophys J. 64:375-383, Feb. 1993.

(Continued)

*Primary Examiner*—Sean E Conley
*Assistant Examiner*—Dean Kwak
(74) *Attorney, Agent, or Firm*—Dinsmore & Shohl LLP

(57) ABSTRACT

Functional biological synthetic composite (BSC) membranes comprising phospholipids, biological membrane proteins and porous supports or membranes are provided. Lipid bilayers are formed on porous polycarbonate (PC), polyethylene terephthalate (PETE) and poly (l-lactic acid) (PLLA) membranes and in laser-drilled pores in a multi-well plastic plate as measured by increased resistance or decreased currents. BSC's comprising functional reconstituted Kv1.5 K channel and/or H/K ATPase transport proteins are also provided c inhibitor), methods of manufacture, and high throughput screening assays employing the inventive membranes are also provided.

13 Claims, 9 Drawing Sheets

Formation of Bilayers on Polycarbonate

OTHER PUBLICATIONS

Seifert K, et al, Charge transport by ion translocating membrane proteins on solid supported membranes. Biophys J. 64:384-391, Feb. 1993.

Bamberg E, et al, Electrogenic properties of the Na+, K+-ATPase probed by preseady state and relaxation studies. J. Bioenergetics and Biomembranes 33(5):401-405, Oct. 2001.

* cited by examiner

SELECTIVELY PERMEABLE MEMBRANES ON POROUS SUBSTRATES

RELATED APPLICATIONS

The present application claims the benefit of U.S. Provisional Application No. 60/691,105, filed Jun. 16, 2005, and is a Continuation-in-Part of PCT application Ser. No. US05/38004, filed Oct. 21, 2005, which claims the priority benefit of U.S. Provisional Application No. 60/620,782, filed Oct. 21, 2004, the entire disclosures of which are hereby incorporated by reference.

STATEMENT REGARDING FEDERALLY SPONSORED RESEARCH OR DEVELOPMENT

This invention was made, at least in part, with funds from the Federal Government, awarded through MURI grant number DAAD 19-02-1-0227 ARMY. The U.S. Government therefore has certain acknowledged rights to the invention.

FIELD OF THE INVENTION

The present invention relates to selectively permeable membranes formed across pores of a porous substrate. Both sides of the membranes are freely accessible. The invention also relates to methods for forming the selectively permeable membrane across pores of a porous substrate. Additionally, the invention relates to fuel cells, toxin detectors and protective devices comprising the selectively permeable membranes.

BACKGROUND OF THE INVENTION

Transport systems for utilizing energy have typically relied on membranes which could not selectively uptake, concentrate or release ions and/or molecules in an organized manner. It would be advantageous to provide and use selectively permeable flexible membrane technology to incorporate membrane proteins suitable for macroscopic and nanoscale preparations. Moreover, it would be advantageous to have a selectively permeable membrane which is essentially free from support material impeding access to at least one side of the membrane. Film-supported selectively permeable membranes have been previously disclosed (Cuppoletti Application No. PCT/US04/27688, the disclosure of which is fully incorporated herein by reference). Thus, there exists a substantial need for an improved membrane transport system that can selectively uptake, concentrate and/or release ions and/or molecules in an organized manner, and that can be used for macroscopic and/or nanoscale applications.

SUMMARY OF THE INVENTION

Accordingly, it is object of the invention to provide a novel selectively permeable membrane having both sides of the membrane accessible. It is a further object of the invention to provide methods for forming selectively permeable membranes across pores of a porous substrates. It is yet a further object of the invention to provide mechanisms and devices comprising selectively permeable membranes including, but not limited to, fuel cells, biocides, toxin detectors and protective devices against toxins.

In accordance with one aspect of the invention, a selectively permeable membrane. The membrane comprises: a bilayer formed across the pores of a porous substrate; and at least one membrane protein incorporated into the bilayer.

In accordance with another aspect of the invention, there are provided methods for forming the inventive selectively permeable membrane. The methods comprise forming a bilayer across pores of a porous substrate, and incorporating at least one membrane protein into the bilayer.

In accordance with yet another aspect of the invention, a fuel cell is provided. The fuel cell comprises a selectively permeable membrane. The membrane comprises: a bilayer formed across pores of a porous substrate; and at least one membrane protein incorporated into the bilayer. The membrane protein is capable of establishing an electrochemical gradient of protons. The invention further provides reduced dimension fuel cells, and fuel cells capable of variable discrete or continuous voltage settings, and having the capability of selecting among voltages.

In accordance with yet another aspect of the invention, a toxin detector is provided. The toxin detector comprises a selectively permeable membrane according to the present invention, and means to facilitate detection of a toxin in or near the membrane.

In accordance with yet another aspect of the invention, a protective device against toxins is provided. The protective device comprises a selectively permeable membrane and a nonpermanent coating. The membrane is capable of establishing an acid gradient. The coating protects against diffusion of toxins that are not degraded. The protective device may be a fabric article, such as clothing intended for soldiers deployed in situations which may bring them into contact with toxins.

In accordance with yet another aspect of the invention, a high throughput assay is provided. The high throughput assay is particularly useful for rapidly screening a plurality of compounds for drug selection and design. The high throughput assay comprises a plurality of wells wherein the plurality of wells comprises a selectively permeable membrane according to the present invention.

The present invention is advantageous for producing a selectively permeable membrane that can utilize energy for the selective uptake, concentration, and/or release of ions and/or molecules in an organized manner. In addition, the selectively permeable membrane is suitable for macroscopic and/or nanoscale preparations.

The following detailed description will be more fully understood in view of the drawings comprising FIGS. 1-4. The Figures are intended to illustrate particular embodiments of the present invention, and should not be construed as limiting the scope of the invention as defined by the claims set forth herein.

(A) Illustrates the scanning electron micrographs of the filters at 500× magnification. The bar indicates 10 μm.

Figure 2:
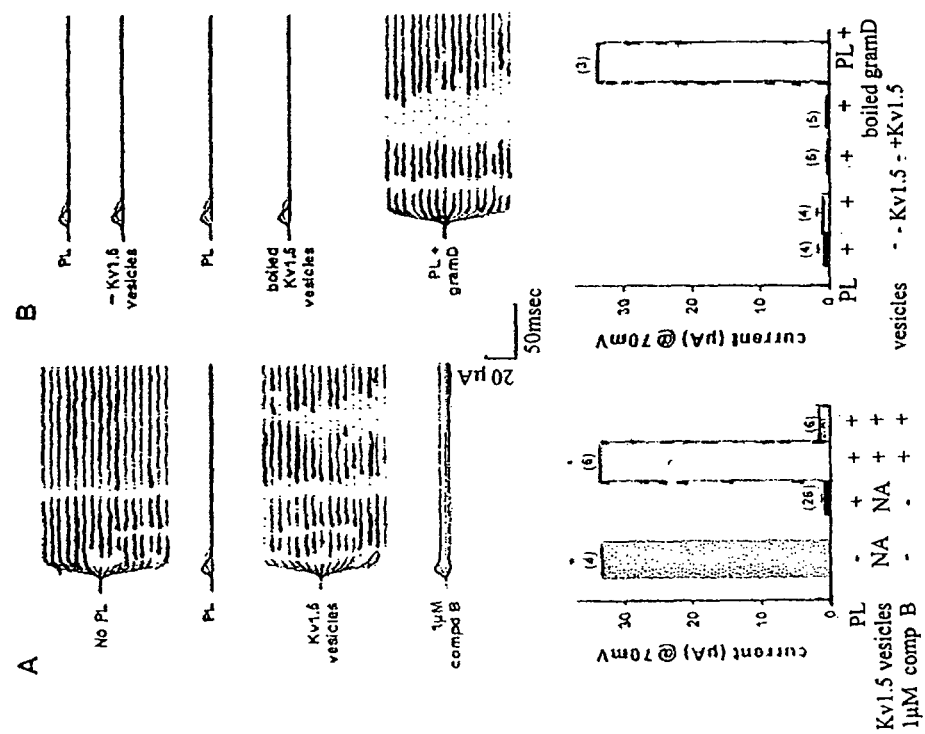

(B) Illustrates summarized resistance measurements across the Filters after adding phospholipids (PL) without or with 50 ng gramicidin D (gram D) in the presence of KCl (permeant cation) or NMDGCl (impermeant cation) medium. Medium is 100 mM KCl or NMDGCl with 10 mM HEPES (pH 7.4). PL used were 3:1 POPS:POPE (40 mg/ml). Data is plotted as mean±S.E. Number of experiments is indicated in brackets. *p=0.001 compared with PL+KCl+gramD FIG. 2. Reconstitution of functional Kv1.5 K$^+$ channels in phospholipid-coated 50 um pores in a plastic plate (A, B) and in phospholipid-coated leached PLLA membranes (C). For (A) and (B), medium on both sides of the pore was 100 mM KCl with 20 MH HEPES (pH 7.4) and phospholipids (PL) used were 3:1 POPS:POPE (40 mg/ml). Well area was 0.3 cm$^2$.

- (A) Sets forth typical current recordings, I-V curves and a summary of the data of experiments reconstituting membrane vesicles isolated from dexamethasone-induced Kv1.5 expressing Lkt$^-$ cells (Kv1.5 vesicles) into phospholipids coating 50 μm pores. Sequential current recordings at different holding potentials from −80 to +70 mV are shown: before and after addition of phospholipids (PL); after addition of Kv1.5 vesicles to the PL and finally after addition of 1 μM compound B, an inhibitor of Kv1.5 K$^+$ channels. Data in the I-V curves and in the summary plotted as means±S.E., with number of experiments in brackets. *P<0.001 vs. PL alone or PL+Kv1.5 vesicles+compd B.
- (B) Illustrates control experiments using membrane vesicles isolated from Lkt$^-$ cells transfected with Kv1.5 cDNA, but not induced with dexamethasone and therefore without Kv1.5$^+$ channels (−Kv1.5 vesicles); boiled membrane vesicles containing Kv1.5 K$^+$ channels (from dexamethasone-induced Lkt$^-$ cells) and gramicidin D (gramD) reconstituted into the phospholipid bilayer. Current recordings are shown with and without vesicles or gramicidin D. Data in the summary are plotted as mean±S.E., with number of experiments in brackets. *P<0.001 vs. PL alone, PL+vesicles (−Kv1.5 or boiled +Kv1.5).
- (C) Resistance was measured of leached PLLA membranes (area 0.3 cm$^2$) after adding phospholipids (PL) and after adding Kv1.5 vesicles to the PL and finally after addition of 1 μM compound B, an inhibitor of Kv1.5 K$^+$ channels. Medium was 100 mM KCl with 10 mM HEPES (pH 7.4). PL used were 3:1 POPS:POPE (40 mg/ml). Data are plotted as mean±S.E. Number of experiments is indicated in brackets. *P<0.001 vs. PL alone, PL+Kv1.5 vesicles or PL+Kv1.5 vesicles+compound B.

Figure 3:
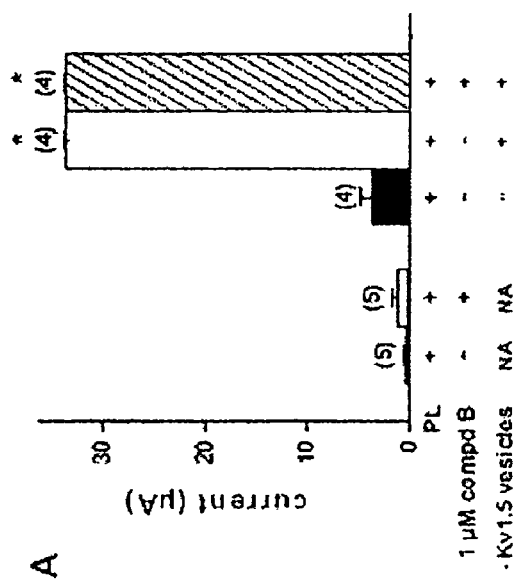

FIG. 3. (A) Control experiments showing specificity of compound B as an inhibitor of Kv1.5 K+ currents and (B) effect of varying compound B on the Kv1.5-mediated K+ current.

- (A) shows the effect of 1 μM compound B on currents @ 70 mV recorded after formation of the phospholipid (PL) bilayer alone (left-hand-side) on polycarbonate filters and after reconstitution of membrane vesicles from uninduced Kv1.5-expressing Lkt-cells (no Kv1.5 K+ channels are present) into the PL bilayers shown on the right-hand-side. Data is plotted as mean±S.E. with number of experiments in brackets. NA, not applicable, *p<0.001 vs PL alone.
- (B) shows a dose-response curve of the effect of increasing amounts of compound B on Kv1.5-mediated K+ currents expressed as ΔI @ 70 mV (% maximum). Data is plotted as mean±S.E. with number of experiments in brackets. From the sigmoidal plot, IC50=170±40 nM (n=6); $\chi^2$=35, p<0.001.

Figure 4:
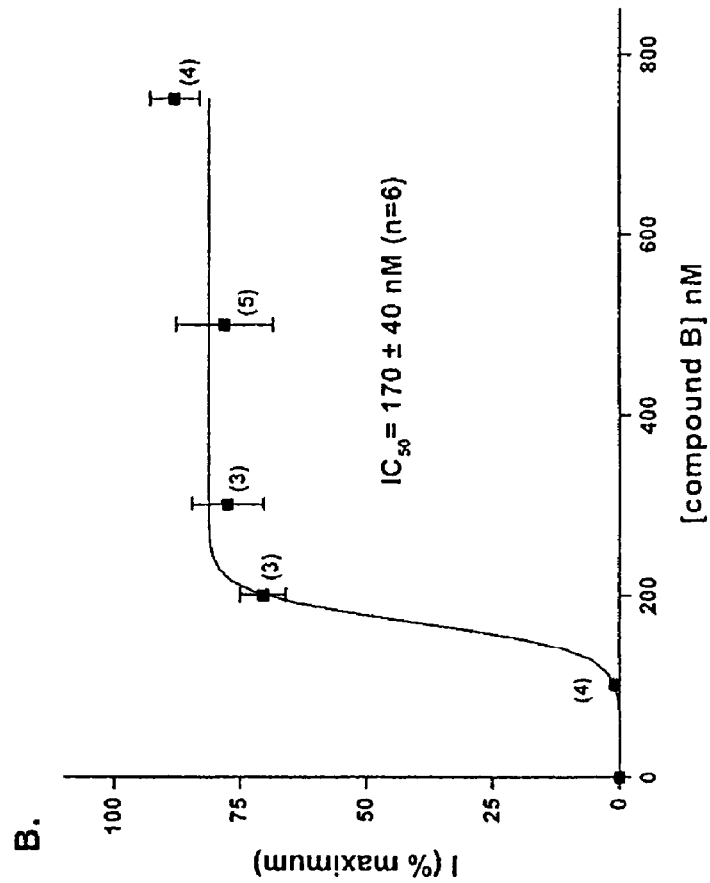

FIG. 4. Reconstitution of H+ transport through the gastric H/K ATPase in phospholipids coating porous polycarbonate filters.

- (A) Representative experiment showing acidification of the medium on the trans-side of the phospholipid bilayer (3:1 POPS:POPE, 40 mg/ml). coating a polycarbonate filter with 0.4 μm pores after addition of hog gastric H/K ATPase-containing membrane vesicles to the bilayer followed by 5 mM MgATP and 100 μg/ml valinomycin to the cis side. Trans medium contained 10 mM KCl and the cis medium contained 100 mM KCl with 10 mM HEPES, pH 7.4. The effect of 100 μM SCH28080, a specific H/K ATPase inhibitor is also shown.
- (B) Rate of acidification measured following reconstitution of hog and rabbit gastric H/K ATPase-containing membrane vesicles into the phospholipid bilayer coating polycarbonate filters. Effect of 100 μM SCH28080 is also shown. Data is plotted as mean±S.E., with number of experiments in brackets.

Figure 5:
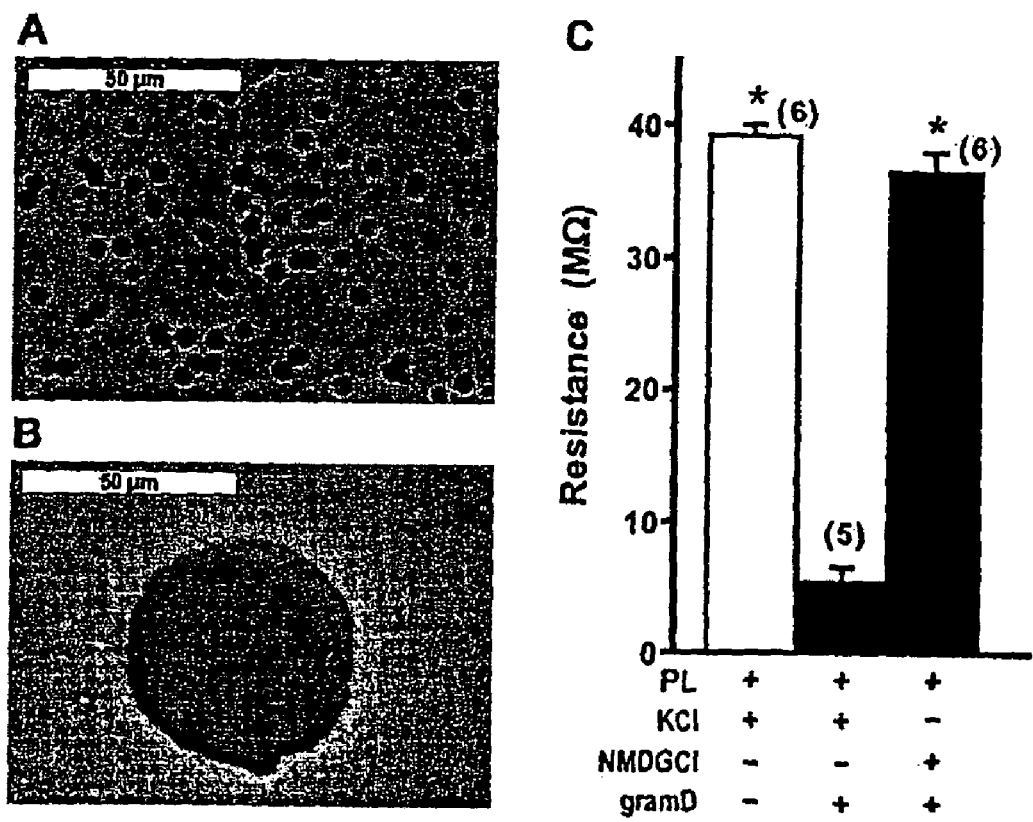

FIG. 5. (A, B) Scanning electron micrographs and (C) assay of lipid bilayer formation on PETE membranes. Scanning electron micrographs of PETE membranes at 2,000× (A) and 20,000× (B) magnification are shown. Bars indicate 50 and 5 μm, respectively. (C) Assay of bilayer formation is shown as summarized resistance measurements across the PETE membranes (area 0.3 cm$^2$) after adding phospholipids (PL) without or with gramicidin D (gramD) in the presence of KCl (permeant cation) or NMDGCl (impermeant cation) medium. Medium is 100 mM KCl or NMDGCl with 10 mM HEPES (pH 7.4). PL used were 3:1 POPS:POPE (40 mg/ml). Data are plotted as mean±S.E. Number of experiments is indicated in brackets. *P<0.001 compared with PL+KCl+gramD.

Figure 6:
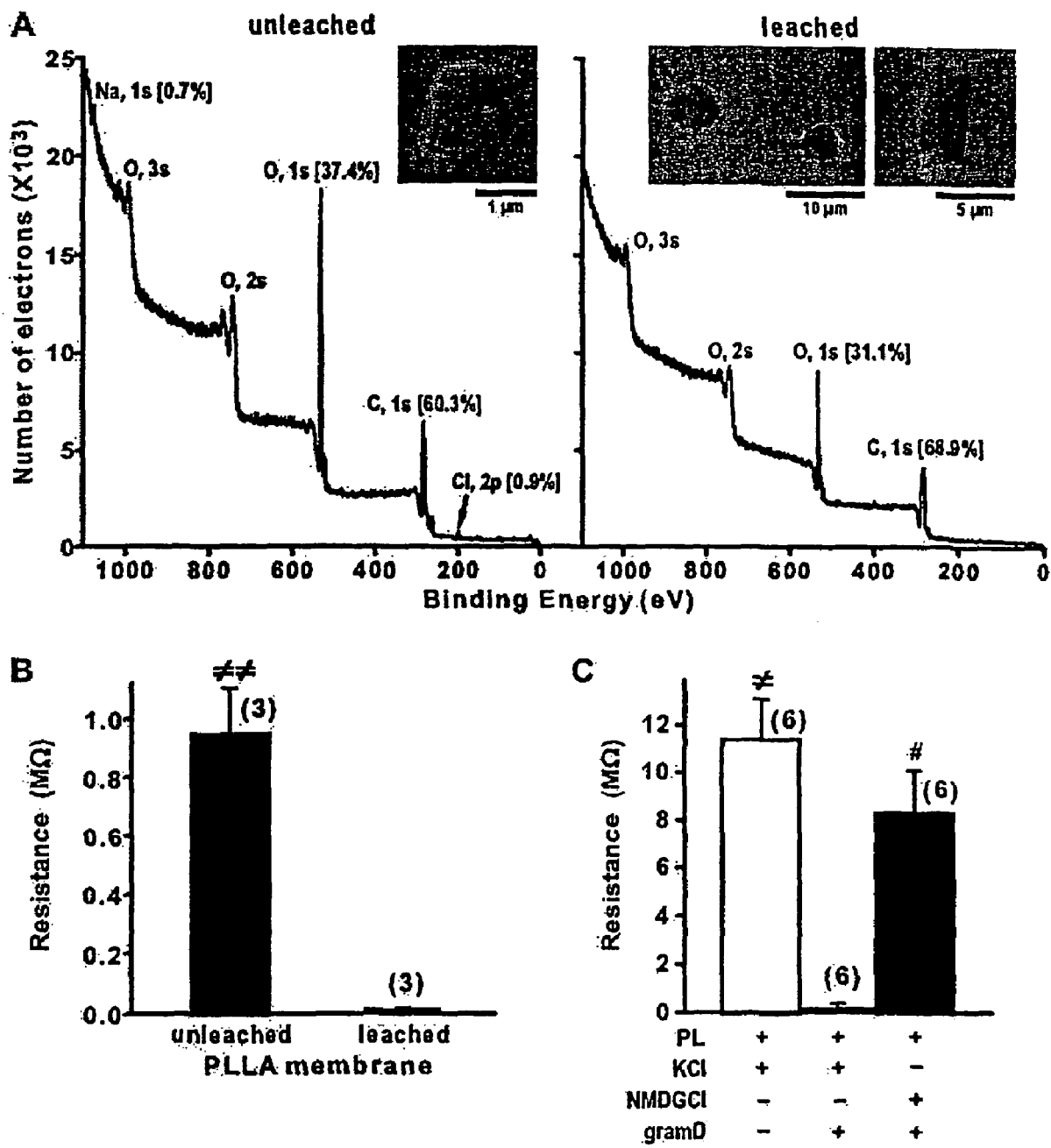

FIG. 6. (A). X-ray photoelectron spectra & scanning electron micrographs (insets); (B) resistance measurements of unleached and leached PLLA membranes; (C) assay of lipid bilayer formation using leached PLLA membranes.

- (A) X-ray photoelectron spectra and scanning electron micrographs (insets) of unleached and leached PLLA membranes. Elements are indicated at the peaks and atomic concentrations are indicated in brackets. The scanning electron micrographs are obtained at 5000×.
- (B) shows resistance measurements of unleached and leached PLLA membranes in KCl medium without phospholipids present. Data are plotted as mean±S.D. Number of experiments is indicated in brackets. #P<0.02 with respect to leached membrane.
- (C) Assay of bilayer formation using leached PLLA membranes shown as the summarized resistance measurements of leached membranes after adding phospholipids (PL) without or with gramicidin D (gramD) in the presence of KCl (permeant cation) or NMDGCl (impermeant cation) medium. Medium is 100 mM KCl or NMDGCl with 10 mM HEPES (pH 7.4). Membrane area was 0.3 cm$^2$. PL used were 3:1 POPS:POPE (40 mg/ml). Data are plotted as mean±S.D. Number of experiments is indicated in brackets. ≠P<0.002; #P<0.005 with respect to PL+KCl+gramD.

Figure 7:
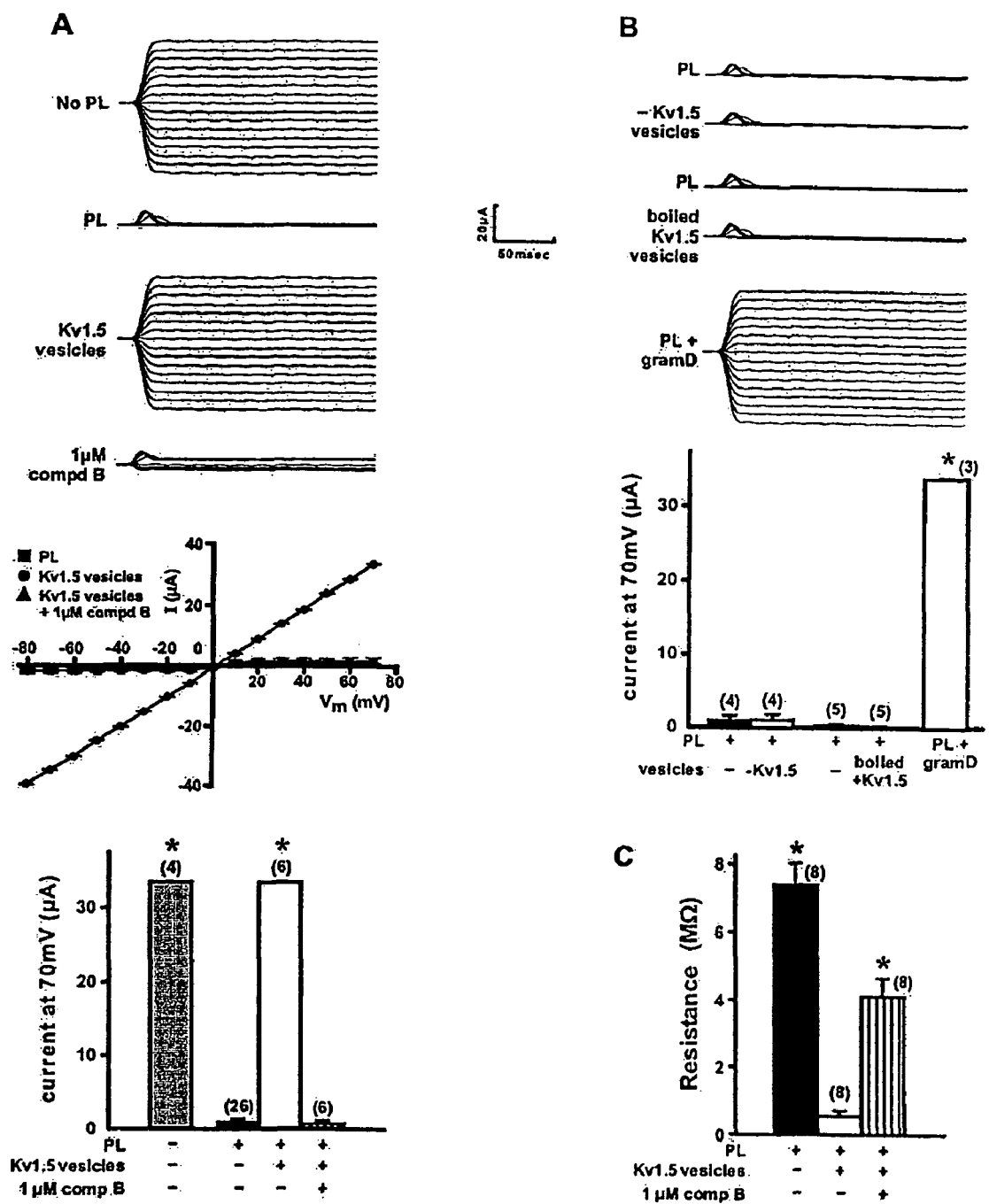

FIG. 7. Illustrates reconstitution of functional Kv1.5 K$^+$ channels in phospholipid-coated 50 μm pores in a plastic plate (A, B) and in phospholipid-coated leached PLLA membranes (C). For (A) and (B) medium on both sides of the pore was 100 mM KCl with 20 mM HEPES (pH 7.4) and phospholipids (PL) used were 3:1 POPS:POPE (40 mg/ml). Well area was 0.3 cm$^2$.

- (A) Typical current recordings, I-V curves and a summary of the data of experiments reconstituting membrane vesicles isolated from dexamethasone-induced Kv1.5 expressing Lkt-cells (Kv1.5 vesicles) into phospholipids coating 50 μm pores. Sequential current recordings at different holding potentials from −80 to +70 mV are shown: before and after addition of phospholipids (PL); after addition of Kv1.5 vesicles to the PL and finally after addition of 1 μM compound B, an inhibitor of Kv1.5 K$^+$ channels. Data in the I-V curves and in the summary are plotted as mean±S.E, with number of experiments in brackets. P<0.001 vs PL alone or PL+Kv1.5 vesicle+compd B.

(B) Control experiments using membrane vesicles isolated from Lkt cells transfected with Kv1.5 cDNA, but not induced with dexamethasone and therefore without Kv1.5 K$^+$ channels (−Kv1.5 vesicles); boiled membrane vesicles containing Kv1.5 K$^+$ channels (from dexamethasone-induced Lkt-cells) and gramicidin D (gramD) reconstituted into the phospholipid bilayer. Current recordings are shown with and without vesicles or gramicidin D. Data in the summary are plotted as mean±S.D, with number of experiments in brackets. *P<0.001 vs PL alone, PL+vesicles (−Kv1.5 or boiled+Kv1.5).

(C) Resistance was measured of leached PLLA membranes (area 0.3 cm$^2$) after adding phospholipids (PL) and after adding Kv1.5 vesicles to the PL and finally after addition of 1 μM compound B, an inhibitor of Kv1.5 K$^+$ channels. Medium was 100 mM KCl with 10 mM HEPES (pH 7.4). PL used were 3:1 POPS:POPE (40 mg/ml). Data are plotted as mean±S.E. Number of experiments is indicated in brackets. *P<0.001 vs PL alone, PL+Kv1.5 vesicles or PL+Kv1.5 vesicles+compound B.

Figure 8:
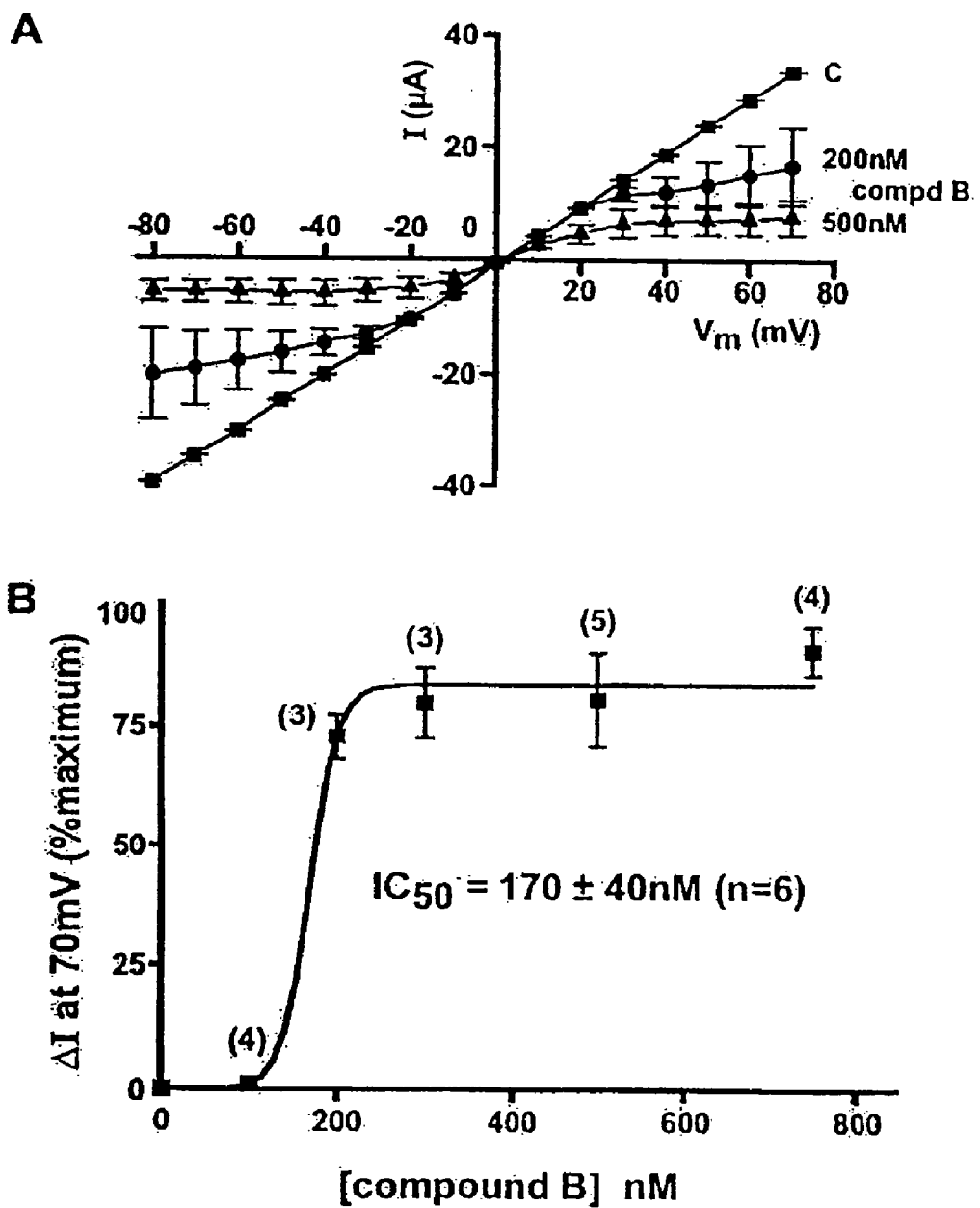

FIG. 8. Illustrates the effect of varying compound B on the Kv1.5-mediated K$^+$ current.

(A) Effect of increasing concentrations of compound B on Kv1.5 K$^+$ currents plotted as I-V curves. Data are plotted as mean±S.E. with number of experiments in brackets. c, control.

(B) Effect of compound B plotted as a dose-response curve with Kv1.5-mediated K$^+$ currents expressed as Δl at 70 mV as % maximum. Data are plotted as mean±S.E. with number of experiments in brackets. From the sigmoidal plot, IC$_{50}$=170±40 nM (n=6); x$^2$=35, P<0.001.

Figure 9:
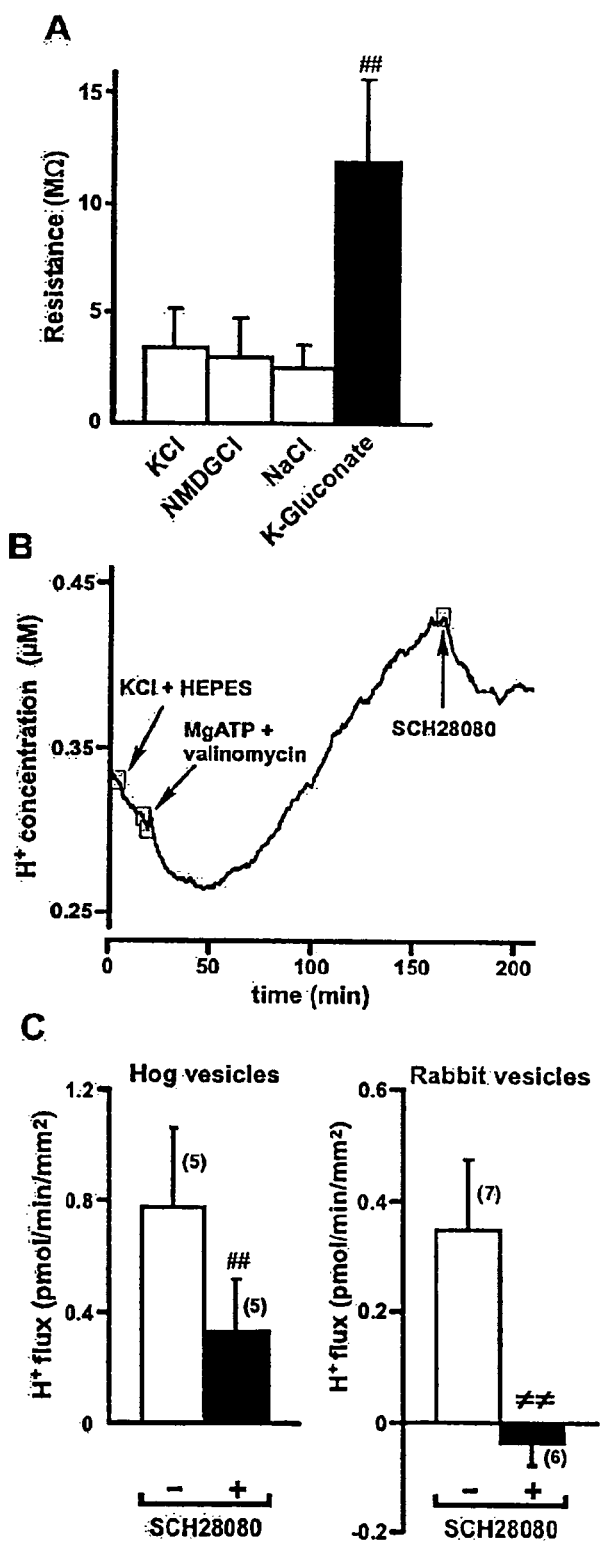

FIG. 9. Illustrates reconstitution of H$^+$ transport by the gastric H/K ATPase in phospholipid coated PC filters (area 0.11 cm$^2$, 0.4 μm pores).

(A) Resistance measurements in different salt solutions after addition of hog gastric membrane vesicles to the lipid bilayer. ##P<0.05 vs other solutions.

(B) Representative experiment showing acidification of the medium in the outer well bathing phospholipid-coated PC filter after addition of hog gastric H/K ATPase-containing membrane vesicles to the bilayer followed by 5 mM MgATP and 100 μg/ml valinomycin to the medium in the inner well. Outer well medium was 10 mM KCl and inner well medium was 100 mM KCl/10 mM HEPES, pH 7.4. Phospholipids used were 3:1 POPS:POPE (40 mg/ml). The effect of 100 μM SCH28080, a specific H/K ATPase inhibitor is also shown.

(C) Rate of acidification with and without 100 μM SCH28080 was measured following reconstitution of hog and rabbit gastric H/K ATPase-containing membrane vesicles in phospholipid-coated PC filters. Data are plotted as mean±S.E. with number of experiments in brackets. ##P<0.05, #P<0.02 vs without SCH28080.

Additional embodiments, objects and advantages of the invention will become more fully apparent in view of the following detailed description.

DETAILED DESCRIPTION OF THE INVENTION

Membranes found in biological systems are made of lipids capable of forming a barrier between aqueous compartments. They consist primarily of a continuous double or bilayer of lipid molecules associated with various membrane proteins. Phospholipids, sphingolipids, and glycolipids make up the three major classes of membrane forming lipid molecules. These lipids are amphipathic (amphiphilic) molecules in that they have a hydrophilic (polar) head and a hydrophobic (non-polar) tail. In the aqueous environment of cells, the polar head groups face toward the water while their hydrophobic tail groups interact with each other to create a lamellar bilayer, and to a lesser extent other aggregate structures depending on the lipid composition and conditions. For example, membrane lipids can form a variety of different shapes including spheres (vesicles), rods (tubes) and lamellae (plates) depending on lipid and water content, and temperature.

Biological membranes consisting of lipid and proteins play a crucial role in almost all cellular phenomena in living cells. The complexity of biological membranes make in vivo utilization of them prohibitive. Hence, cell-free reconstituted membranes were developed and have been known for over three decades. (See, e.g. Tien H. T., Bilayer lipid membrane (BLM) (Marcel Dekker, New York, N.Y.), 1974). However, these are fragile structures and researches struggled to develop forms which provide capability for more rigorous and flexible manipulations. Less fragile supported membranes were developed, but these were limited to having only one side of the membrane accessible. The present invention provides a selectively permeable membrane having both sides of the membrane fully accessible, that is formed across pores of a porous membrane, making it stronger and capable of undergoing rigorous manipulations.

"Membrane protein," as used herein, is intended to include all naturally occurring and engineered proteins which are capable of associating with a lipid bilayer. Examples of membrane proteins include membrane-associated receptors, transporter proteins, enzymes, and immunogens. Proteins can associate with membranes in different ways. Integral membrane proteins contain at least one component that is embedded within the lipid bilayer. The non-polar segments of these integral membrane proteins, which embed in the lipid bilayer perpendicular to the surface of the membrane, may consist of a hydrophobic region of the polypeptide, a covalently attached fatty acid chain or other types of lipid chains. Peripheral membrane proteins normally associate with the lipid bilayer through non-covalent interactions with these integral membrane proteins. Additionally, some peripheral membrane proteins are located entirely in the aqueous phase, associated with the membrane through a covalently attached fatty acid or lipid chain. Glycosylphosphatidylinositol anchors, found at the C-terminus of soluble proteins, result in the attachment of these proteins to the membrane surface (Turner, A. J., Essays Biochem. (1994) 28:113-127).

Membrane proteins in biological systems are organized in various structures, leading to different functions on various surfaces and intracellular membranes of cells. Organization of membrane proteins allows for utilization of energy, uptake and concentration of ions and/or molecules across and into cells, and utilization of cell structures needed for life processes. Membrane proteins may be highly regulated. Under some physiological conditions, ion transport proteins capable of moving billions of ions per second can be reversibly silenced and again opened by intracellular regulators, thereby controlling the flow of solute. The exit and entry of ions and/or molecules across biological membranes control important life processes. Some of the most potent toxins (for example blowfish toxins that affect sodium channels, scorpion, snake and marine snail toxins and organophosphates) affect the membrane proteins and thus are highly toxic.

Membrane proteins are present in all living organisms. They are imbedded in lipid bilayer membranes that are otherwise essentially impermeable to water, to all inorganic ions, and are only permeable to small hydrophobic substances, unless the lipid membranes also contain transport proteins. Transport processes can be primary active (using energy of light or hydrolysis of high energy phosphate compounds, e.g.), secondary active (using gradients produced by primary active transport systems, e.g.), or passive, facilitating the diffusion of substances according to the concentration or electrical gradients. Transport proteins are saturable and exhibit varying degrees of selectivity. In some cases, substrate selectivity can be broad and can be altered by changing the pore structures. Some transport proteins such as sodium channels, are very selective for a single ion, while other membrane proteins such as the multiple drug resistance protein, (MDR) which expels chemotherapeutics and other toxins from cells, are quite versatile in their transport specificity, and are capable of the transport of a number of compounds that are not structurally related. Such transporters, as they exist or after engineering, may be used to transport new materials in a specific manner.

Accordingly, the present inventor has developed a novel selectively permeable membrane having membrane proteins incorporated therein, that can utilize energy for the selective uptake, concentration, and/or release of ions and/or molecules in an organized manner. In one embodiment, the present invention is directed to a novel selectively permeable membrane. The membrane comprises a bilayer formed across pores of a porous substrate, and at least one membrane protein incorporated into the bilayer. Another embodiment provides methods for forming a selectively permeable membrane. The methods comprise forming a bilayer across pores of a porous substrate, and incorporating at least one membrane protein into the bilayer. The present invention is further directed to devices comprising the selectively permeable membrane including, but not limited to, fuel cells, toxin detectors and protective devices against toxins.

The presently inventive selectively permeable membrane comprises a bilayer formed across pores of a porous substrate. As used herein, "selectively permeable" is intended to refer to a film property which allows some ions and/or molecules to cross the film more easily than other ions and/or molecules. In one embodiment, the selectively permeable membrane is selectively permeable to protons, water, or combinations thereof. The bilayer is formed across the pores such that both sides of the bilayer are accessible. In one embodiment, the bilayer comprises a lipid bilayer.

The porous substrate may be comprised of any porous material suitable for development of a lipid bilayer and reconstitution of membrane proteins. Such materials include polycarbonate filters with manufactured pore diameter sizes of about 0.4 to about 8 μm, and laser-drilled arrays of from about 10 to about 100 μm. The ability to support lipid bilayers is dependent upon pore size. Pore diameter sizes of about 50 μm are capable of supporting stable bilayers for up to four hours. A specific embodiment provides pore sizes of less than about 20 μm. In a further specific embodiment, commercially available millipore micro porous polycarbonate filters of various pore sizes (0.4, 3, 5, and 8 μm) and a multi-well plastic plate with 10-100 μm Lenox-laser drilled holes (one per well), available from Procter & Gamble Pharmaceuticals of Cincinnati, Ohio, are used to form the bilayer.

Without intending to be limiting, other porous materials which are suitable as the porous substrate include perfluorinated polymers such as fluorinated ethylene-propylene (FEP) copolymers including TEFLON®, which is DuPont's trademark for fluoropolymer resins, and the Daikin fluoropolymer resins which are marketed in the United States of America by Sumitomo trademarked as NEOFLON®. Also suitable are FLUON® polymer resins, AGLOFON® polymer resins available from Ausimont, and KEVLAR® resins. NAFION® is a DuPont product which is a complex having an equilibrium of ionic selectivity as well as transport properties and provides the ability to adapt to specific uses and needs, such as fuel cell operations. It is a perfluorinated polymer that contains small proportions of sulfonic or carboxylic ionic functional groups. Its general chemical structure can be seen below, where X is either a sulfonic or carboxylic functional group and M is either a metal cation in the neutralized form or an H+ in the acid form.

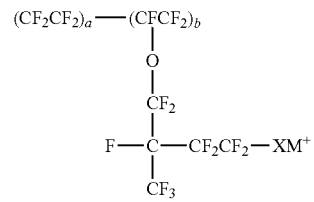

NAFION® Perfluorinated Ionomer

A typical fluorinated polymer useful as the porous substrate according to the present invention has the following properties: thickness in the range of about 1-100 microns, weight per unit area of about 5-80 g/m$^2$; density of about 1.3 to 2.20 g/cm$^3$; and a break strength of about 0.2-20 kg/cm.

A bilayer is formed across the pores of the porous substrate. As used herein, "bilayer" is intended to refer to at least two layers of a lipid. The layers include, but not limited to, a biological lipid, a synthetic lipid, or combinations thereof. In one embodiment the bilayer is formed from phospholipids. The lipid bilayer is capable of forming a selectively permeable barrier between aqueous compartments.

The selectively permeable film supported membrane further comprises at least one membrane protein incorporated into the bilayer. "Membrane protein," as used herein, includes all naturally occurring and engineered proteins which are capable of associating with a lipid bilayer. Examples of membrane proteins include membrane-associated receptors, transporter proteins, enzymes, and immunogens. These membrane proteins can utilize energy for the selective uptake, concentration, and/or release of ions and/or molecules in an organized manner. As used herein, "transport protein" is intended to refer to a membrane protein which permits the passage of certain ions and/or molecules, but not others, into the bilayer of the selectively permeable membrane. The membrane protein includes, but is not limited to, native protein, recombinant protein or combinations thereof. In one embodiment, the bilayer formed across the pores of a porous substrate may be referred to as a macroscopic membrane, while the membrane protein may be referred to as a nanostructure. A nanostructure is has domains of typically less than about 100 nanometers in size. In a further embodiment, the membrane proteins exhibit vectorial transport function.

The membrane proteins of the present invention retain at least some of their biological function after they have been incorporated into the bilayer. After formation of the selectively permeable membrane, the membrane is tested for the presence of desirable biological functioning. One means of verifying bilayer formation is by reconstituting the channel forming polypeptide, gramicidin-D, in the bilayer. This allows ion conduction through the lipid if the lipid is a single bilayer thick. Electrical resistance is monitored and gramicidin reduces the resistance of the membrane. Two non-limiting examples of functionality testing of incorporated membrane proteins include: (1) determination of functional Dv1.5 potassium channel incorporation by noting increased current across the bilayer upon treatment with vesicles containing Dv1.5 potassium channels, and a decrease in current upon addition of compound B, a specific inhibitor of Kv1.5 potassium channels; (2) determination of a functional gastric proton pump and associate protein by an assay based on the development of ATP-driven acidification across membranes containing the functional complexes, and loss of acidification when the membranes are treated with a specific inhibitor of the proton pump, SCH28080.

In accordance with the present invention, one skilled in the art would recognize the various methods suitable for incorporating at least one membrane protein into the bilayer. In one embodiment, the membrane protein may be spontaneously inserted into the bilayer. In another embodiment, the membrane protein may be incorporated into the bilayer by a lipid vesicle, a detergent solution, or combinations thereof. The method of incorporating at least one membrane protein into the bilayer may be fully or partially conducted, or automated, by robotics.

In one embodiment, the membrane protein comprises the gastric HCl transport system which includes the gastric H/K ATPase, a $K^+$ channel, and a $Cl^-$ channel protein. The $K^+$ Channel and Cl– channel are regulated by changes in pH, voltage, and ion concentrations, and are further regulated by covalent modifiers. The HCl formed by this membrane protein may be used as a general biocide for killing bacteria, fungi, and viruses, a physiological function of HCl in the digestive tract. The HCl may also be used for inactivation of peptides, proteins, and acid sensitive organic compounds. "Inactivate," as used herein, includes the range from where the normal biological effect of the organic compound is diminished, to the point where it is completely eradicated, as determined from the perspective of a subject experiencing the biological effect.

Since each $H^+$ produced results in an equivalent of $OH^-$ from the splitting of water, production of base on the opposite side of the membrane provides equally useful chemical secretions. HCl may be used for the concentrative uptake of weak bases (having a pH of greater than about 8 and less than about 10) such as tributylamines (a stabilizer of the neurotoxin, sarin) to high levels for the purposes of detection of the toxin. In the case of weak bases such as tributyl amine, the un-ionized weak base passively crosses the lipid membrane, and becomes protonated. The protonated weak base accumulates, since the charged compound cannot cross the membrane. Similarly, weak acids (having a pH of greater than about 4 and less than about 6) such as dinitrophenol, picric acid and trinitrotoluene may be detected with such membranes based on their ability, acting as protonophores, to collapse HCl gradients.

Moreover, chemical and electrical gradients may be inter-converted according to chemiosmotic hypothesis. Accumulation of any substance may be accomplished at the expense of a gradient, as long as an appropriate membrane protein that recognizes the electrical or chemical gradient and the ion and/or molecule in question is available. Thus, HCl gradients may be used for the accumulation of another ion and/or molecule as long as another membrane protein may be identified or engineered to respond to the electrical or chemical gradients in exchange for the ion and/or molecule in question.

In another embodiment of the present invention, the membrane protein may comprise ion channels and transporters involved in maintaining homeostasis. These membrane proteins include, but are not limited to, those operable to establish H, K, Na, and $Ca^{2+}$ gradients. These gradients may be inter-converted by a variety of techniques, including, but not limited to, the use of synthetic and natural exchange ionphores such as nigericin (a K/H exchanger), monensin (a Na/H exchanger), ionomycin (a $Ca^{2+}$/H exchanger) or a combination of FCCP (an electrogenic protonophores) with an electrogenic ionophore such as valinomycin.

When HCl transport is successfully incorporated into a selectively permeable membrane, it follows that Na, K, and $Ca^{2+}$ gradients may also be generated using other primary active membrane proteins. The HCl transport system is not unique in producing large gradients. A close relative of the H/K ATPase is the Na/K ATPase (64% amino acid homology). The Na/K ATPase accomplishes the net electrogenic movement of 3 Na for 2 K. With other appropriate transporters, it can accomplish the production of charge and sodium gradients that can also be employed by other membrane proteins for the selective concentration (or release) of other ions and/or molecules. The Na/K ATPase is also available in large quantities and has been reconstituted into a variety of systems, including solid supported membranes. An example of sodium dependent secondary active transport proteins in nature include the sodium dependent glucose transporter that is responsible for the concentrative uptake of glucose from the intestine using the electrochemical gradient produced by the Na/K ATPase. Glucose transporters present on the basolateral membrane of the intestinal cell facilitate the downhill transport of glucose into the blood.

These and other membrane proteins, which are regulated by pH, ionic conditions, membrane voltage, and/or intracellular second messengers, may be genetically engineered to function in the environment of the presently inventive membrane when regulatory elements are missing, or when the substance would react with environmental agents, using techniques within the ability of those of ordinary skill in the art, in view of the present disclosure.

The present invention is also directed toward methods for forming a selectively permeable membrane. The methods comprise forming a bilayer across pores of a porous substrate, and incorporating at least one membrane protein into the bilayer. The membrane is accessible from both outer sides of the bilayer. One skilled in the art will appreciate the various known techniques for forming a lipid bilayer, any of which may be used herein.

One embodiment of the present invention provides a fuel cell. The permeability of substrates comprising NAFION® polymer resins to ions is well-documented and NAFION films are a common component of fuel cells. (See, for example, PCT Patent Application Ser. No. WO 2005/022136 A1, the entire disclose of which is incorporated herein by reference.) It has been previously disclosed that the application of phospholipid to one side of a NAFION® film substrate prevents back-flux and affords a superior ion concentrative means. It is also known that application of phospholipid to both surfaces of a NAFION film substrate substantially eliminates flux. Incorporation of ionophores into the phospholipid bilayer re-establishes flux. Similarly to the phospholipid-coated NAFION, a membrane according to the present invention, wherein the bilayer is a phospholipid bilayer, is substantially impermeable to ions. Upon incorporation of membrane proteins comprising ionophores into the phospholipid bilayer, ion flow is established and flux across the membrane may be measured. The present inventor surprisingly discovered that a membrane according to the present invention, comprising a phospholipid bilayer having gramicidin D incorporated into the bilayer as an ionophore, exhibits a higher flux than the NAFION® substrate alone. Gramicidin D has a unit pore size, on the average, of approximately 10 Å, and a flux of $10^8$ ions per second, per gramicidin D molecule is observed across the inventive membrane. Hence, a superior ion flow may be realized across an extremely small membrane surface area by employment of the presently inventive membrane. The present invention therefore provides fuel cells capable of having significantly reduced dimensions when compared to currently available fuel cells, controlling for voltage potential.

One embodiment of the present invention provides a fuel cell comprising a selectively permeable membrane, the membrane comprising a bilayer formed across pores of a porous substrate, and having at least one membrane protein incorporated into the bilayer. Additionally, any fuel cell source for the production of protons may be used. Uniquely, the inventive membrane serves a dual function. In addition to permitting a high rate of ion flow, it also provides a barrier to prevent the flow of ions unless a functional ion permeable membrane protein is present and activated by an appropriate driving force. The functional membrane protein permits the flow of ions with activation by an appropriate driving force. The membrane protein is capable of operating to establish an electrochemical gradient of protons. The electrochemical gradient may be continuous or discrete. In a further embodiment, the electrochemical gradient of protons is established at ambient temperatures. In a more specific embodiment, a continuous production of hydrogen ions is obtained and serves as a primary source of protons for a fuel cell.

In one specific embodiment of the fuel cell, the bilayer comprises a phospholipid bilayer, and the at least one membrane protein comprises at least one ionophore. The ionophore permits a flow of ions through the phospholipid bilayer. In a very specific embodiment, the ionophore comprises gramicidin D. The flow of ions may be controlled by a regulator of the functioning of the membrane protein, including, but not limited to, manipulation of pH, voltage, ion concentration, genetic modification, and chemical modification. Chemical modifiers may be associated with the membrane and may covalently or noncovalently modify the ionophore. The modification may silence the ionophore, or reduce/enhance ion flow through the ionophore by varying degrees. Chemical modifiers may be associated to the membrane in particular areas, ratios or other deliberate groupings, permitting selective modification and control of the ion flow and voltage. Strategically placed and triggered, such modifiers permit pre-selection of voltage across a membrane, providing fuel cells having the capability of producing variable pre-selected discrete voltages, and/or a continuum of increasing or decreasing voltage within a pre-selected range.

A further embodiment of the present invention provides toxin detectors. A toxin detector, according to the invention, comprises a selectively permeable membrane and means to facilitate detection of a toxin in or near the membrane. One skilled in the art will appreciate the various means for detecting a toxin in or near the membrane, which are known in the art and suitable for use herein. In one embodiment, the means to facilitate detection of a toxin includes, but is not limited to, antibodies, peptides, enzymes, or combinations thereof that can recognize molecular elements of an ion and/or molecule. In another embodiment, molecularly imprinted polymers may be used as a means to facilitate detection of a toxin. In yet another embodiment, membrane proteins may be modified in accordance with a particular ion and/or molecule, for example, an organophosphate. Other techniques to facilitate detection of a toxin include, but are not limited to, molecular imprinting, sensitized lanthanide luminescence, and membrane bound acetyl cholinesterase.

The invention is further directed toward protective devices against toxins. The device comprises a selectively permeable membrane according to the present invention, and a nonpermanent coating. The membrane is capable of operating to establish an acid gradient. The nonpermanent coating protects against diffusion of toxins that are not degraded. The protective device may further comprise at least one catalyst facilitating transport. One skilled in the art will appreciate various catalysts which are known in the art for facilitating transport and suitable for use herein. It is apparent to one of ordinary skill in the art that the protective device may be employed to protect various materials. In one embodiment, the material may be a surface of a living or non-living object. In a specific embodiment, the protective device comprises, at least in part, a fabric, such as clothing, and provides protection to the wearer. In a more specific embodiment, the clothing comprises a warfare related article.

One skilled in the art will appreciate the various known chemical agents that may be released by activation of membrane proteins that respond to electrical/chemical gradients when appropriately constituted into a selectively permeable membrane according to the present invention, in view of the present specification. In one embodiment, the chemical agent is an acid. In another embodiment, the chemical agent comprises glutathione, cysteine, S-330, or combinations thereof. Specifically, these chemical agents are known to protect cells against chemical warfare agents such as mustard gas and the like. Moreover, sodium-dependent and independent cysteine transporters and glutathione transporters suggest that a native or engineered protein (such as MDR variants or engineered channels) can facilitate the transport of S-330, or other substances, regardless of their chemical properties.

Another specific embodiment of the invention provides a novel high throughput assay comprising a plurality of wells wherein each of the wells comprises at least one pore. A selectively permeable membrane comprising a bilayer having at least one membrane protein incorporated therein is formed across the pores. The membranes mimic a desired biological function and a base level of that function is determined. Rapid screening and selection of compounds according to how they alter the base level of the biological function is possible. This assay has particular utility in drug screening and selection and the development of desired pharmaceutical agents. Commercially available well arrays and well-known techniques in the art make this assay adaptable for automation and robotic applications.

The following example illustrates specific embodiments of the present invention and is not intended to limit the invention as defined by the claims herein. Additional embodiments and variations within the scope of the claimed invention will be apparent to those of ordinary skill in the art in view of the present disclosure.

Example 1

This example illustrates an embodiment of bilayer formation, membrane transport reconstitution and testing for functionality. The bilayer is formed over pores of a polycarbonate substrate comprising naturally present pores or drilled holes. Millipore micro porous polycarbonates of various pore sizes (0.4, 3, 5, and 8 µm, e.g.) are commercially available, and a multi-well porous plastic plate with 10-100 µm Lenox-laser drilled holes (1/well) is available from Procter & Gamble Co. and is used for stable bilayer formation. Techniques for bilayer preparation are known by those of ordinary skill in the art. In one embodiment 5 µl phospholipid is added in a 3:1 POPS:POPE 40 mg/ml in decane in plastic wells with 50 µm pores. After 30 minutes, 100 µl of 100 mM KCl is added to each well. The well tray is placed into a holder filled with 100 mM DCl so that the entire bottom of the tray is covered, with no buffer or other components. The bilayer is verified according to the gramicidin-D (a cation selective antibiotic) method wherein electrical resistance is monitored to observe the effect of gramicidin in reducing the resistance of the membrane. Current flow is measured by placing one electrode in the desired well and one in the surrounding liquid outside the well. The well tray is removed from the holder and placed in separate dry holder. 85 µl of the 100 mM KCl is removed from each well, being careful not to disturb the bilayer.

The verified bilayer is incubated with vesicles comprising H/K ATPase or Kv1.5 potassium channels. 3 µl of vesicles is added to each well which was determined to have a verified bilayer. Spontaneous fusion with the bilayer is allowed to proceed for 30 minutes to one hour, at which point H/K ATPase induced acidification or potassium ion currents across the bilayer membrane are measured. A desired amount of 1000 mM KCl is added to the well (for example, add 90 µl of 100 mM KCl for 1000 nM, add 92.5 µl of 100 MM KCl for 750 nM). The well tray is placed back into the holder with the 100 mM KCl and current flow is measured as before. Add a desired amount of a suitable 10 µM inhibitor to achieve a final desired concentration with the final volume of 100 µl. When the gastric proton pump H/K ATPase is reconstituted on the bilayer over the pores, ATP-dependent transport of acid across the bilayer is observed that can be inhibited by 100 µm SCH-28080 (a specific inhibitor of the H/K ATPase). The current is measured as described earlier, after one hour. This demonstrates functional reconstitution of the gastric proton pump, H/K ATPase. When infused with vesicles comprising Kv1.5 potassium channels, the membrane exhibits potassium ion currents which are inhibited by 2-(3,4-dimethylphenyl)-3-[2-(4-methoxyphenyl)ethyl]-thiazolidin-4-one, a specific inhibitor of Kv1.5 channels. Ion currents are not present when the vesicles lack Kv1.5 or when Kv1.5 vesicles are boiled.

Example 2

The following experimental example illustrates further specific embodiments of the inventive membranes and methods.

A. Membrane Preparation, Characterization and Attaching to the Insert/Well

Polycarbonate (PC) and polyethylene terephthalate (PETE) membranes are purchased (see Materials), but porous poly l-lactic acid (PLLA) membranes are synthesized using the solvent casting/particulate leaching technique (Mikos et al. Polymer 35 (1994) 1068-1077). Finely ground NaCl (0.1 g) is dispersed in PLLA in chloroform (40 ml) with an ultrasonicator. The solution is cast in several glass Petri dishes and the chloroform is allowed to evaporate for 48 hr to give PLLA/NaCl composite membranes. These membranes are unleached PLLA membranes. These unleached PLLA membranes are then washed in deionized water with vigorous shaking to dissolve the NaCl particles embedded in the membranes. When NaCl leaches out, a porous PLLA membrane is formed. The thickness of these membranes is between 10-15 µm.

Membrane pore size and surface morphology is examined using scanning electron microscopy. PC, PETE and PLLA membranes are immobilized on a sample holder using carbon tape (SPI supplies, West Chester, Pa.). Colloidal graphite (Ted Pella Inc, Redding, Calif.) is applied to the edges of the samples to ensure electron dissipation. Samples are sputtered with a Denton Vacuum, LLC and a HITACHI S-4000 scanning electron microscope is used to obtain the images. To monitor the leaching process, the PLLA membranes (unleached and leached) are characterized using X-ray photoelectron spectroscopy (XPS). A Perkin Elmer 5300 Spectrometer [MgKa radiation (1254 eV)] is used to obtain the XPS data.

PC membranes at the base of polystyrene inserts or wells of Millipore Multiscreen MIC filter plates are removed and replaced with PETE or PLLA membranes. The plastic surface of Millipore inserts is oxygen plasma etched for 30 seconds to promote the adhesion of the PETE or PLLA membranes to the base of the insert. A capacitively coupled, rf-powered plasma reactor, operating at a frequency of 13.6 MHz, is used for oxygen plasma etching. Oxygen plasma etching is carried out in a radio frequency reactor using 100 W power and 0.5 Torr pressure. The oxygen flow rate is maintained at 200 cc/mm. PETE membranes are attached to the insert using a polyurethane adhesive. PLLA membranes are oxygen plasma etched for 5 seconds before attaching to inserts with two-part epoxy.

B. Phospholipid Bilayer Formation with and without Gramicidin and Resistance Measurements Bilayer formation is studied using PC, PETE and PLLA membranes (area=0.3 cm$^2$). Phospholipid bilayers are made by adding 10 ml of 3:1 POPS:POPE (40 mg/ml) in n-decane to the membranes and waiting for 30 min. 100 mM KCL/10 mM HEPES (pH 7.4), is then added to both sides of the membrane (150 µl inside insert or well; 200 outside solution) and left for 30 minutes. A multimeter and Ag/AgCl reference electrodes are used to measure the resistance across the phospholipid-coated membranes. When gramicidin D is used, it is mixed with the lipids to a final concentration of 1 µg/ml. 10 µl of the lipid/gramicidin mixture is added to the membranes. After 30 minutes medium is added to both sides of the lipid-coated membrane (both inner and outer wells) and left for another 30 minutes. Resistances of the lipid-coated membranes are measured with two different media bathing the lipid bilayer on both sides: 100 mM KCl/10 mM HEPES (pH 7.4) and 100 mMNMDGCl/10 mM HEPES (pH 7.4). Reconstitution of gramicidin D is also done using the 96-well plastic plate with laser drilled holes and current is measured as described below.

C. Phosphodipid Bilayer Formation, Reconstituon of Kv1.5 C Channels, Current and Resistance Measurements To investigate reconstitution of ion channels, plasma membrane vesicles containing Kv1.5, K$^+$ channels are prepared from an Ltk$^-$ cell line (mouse fibroblast cells) stably overexpressing Kv1.5 K$^+$ channels under the control of a dexamethasone promoter as previously described (Matsuno, et al. Biochem. Biophys. Acta 1665 (2004) 184-190). Dexamethasone-specific induction of channel expression is totally specific for Kv1.5 channels. Plasma membrane vesicles are also prepared from Kv1.5 cDNA-transfected-but-uninduced Ltk$^-$ cells, which did not express any Kv1.5 K$^+$ channels. A 96-well plastic plate with laser drilled pores varying from 10-100 μm (1/well) is used. Well area is 0.3 cm$^2$. The phospholipid bilayer is made by adding 5 μl of 40 mg/ml 3:1 POPS:POPE in n-decane to each well. After 30 min 100 mM KCl/20 mM HEPES (pH 7.4) is added to both sides of the bilayer (both inner and outer wells). After a further 30 min, the solution from the inner well is removed and plasma membrane vesicles (5 μl) containing Kv1.5 K$^+$ channels are added to the lipid coated wells. After 30 min, 100 mM KCl/20 mM HEPES (pH 7.4) is returned to the well and currents across the bilayer are measured with an HS-2A headstage and Gene Clamp 500 amplifier (Axon Instruments, Foster City, Calif.) and filtered at 50 Hz. Voltages ranging from −80 to +70 mV are applied in 10-mV increments for 200 msec and electrical currents are recorded using pCLAMP version 5.5. When indicated, compound B, an inhibitor of Kv1.5 K$^+$ channels (see U.S. Pat. No. 6,174,908) is added.

Reconstitution of Kv1.5 K$^+$ channels is also carried out using lipid coated PLLA membranes (area=0.3 cm2) and resistance is measured as described in the previous section. Effects of compound B are also tested.

D. Phospholipid Bilayer Formation, Reconstitution of the Gastric H/K ATPase and Measurement of H+ Transport Hog and stimulated rabbit gastric membrane vesicles are isolated according to methods known in the art (Saccomani et al. Biochim. Biophys. Acta 465 (1977) 311-330, Cuppoletti, et al. J. Biol. Chem. 259 (1984) 14952-1 4959). A lipid bilayer is made on 0.4 μm polycarbonate filters (area=0.11 cm$^2$) in Multiscreen Caco-2 filter plates. 5 ml of 40 mg/ml 3:1 POPS:POPE in n-decane is added to the filter (inner well) and after 30 min 100 mM K-gluconate solution is added to both sides (inner & outer wells). After 2 hrs, resistance is measured with a multimeter and Ag/AgCl electrodes to ensure that a bilayer had formed. The K-gluconate solution in the inner well is removed and 5 μl of hog or stimulated rabbit gastric vesicles are added to the inner well and left for 1 hr. Resistance is then measured in 100 mM K-gluconate, KCL, NaCl and NMDGCl. To measure H$^+$ transport, 200 μl 10 mM KCL is added to the outer well and 100 μl of 100 mM KCL, 10 mM HEPES pH 7.4 is added to the inner well. pH of the medium in the outer well (pH$_o$) is measured using a PHR-146 pH Electrode (LAZAR Research Labs. Los Angeles, Calif.) and an Accumet pH meter 910 (Fisher, Pittsburgh, Pa.). When the pH$_o$ is almost constant, 5 μl 100 mM MGATP solution and 1 μl 10 mg/ml valinomycin are added to the inner well and pH$_o$ was followed. When indicated 1 μl 10 mM SCH28080, an H/K ATPase inhibitor (Wallmark et al. J. Biol. Chem. 262 (1987) 2077-2084) is added to the inner well. The change in pHo over time is recorded using AXOTAPE (Union City, Calif.).

E. Analysis

Statistical analysis is carried out using the Student's t-test. Curves are fitted using Origin 5.

F. Materials

Multiscreen-MIC (10 μm thick) and Multiscreen Caco-2 (0.4 μm pores) filter plates may be obtained from Millipore Corporation (Bedford, Mass.). Multiscreen-MIC plates contained inserts with polycarbonate membranes comprising 3, 5 and 8 μm pores at the bottom. Porous 9 μm thick PETE membranes with 3 μm pores may be obtained from GE Osmonics, Inc. (Minnetonka, Minn.). PLLA is available from Polysciences, Inc (Warrington, Pa.). Polyurethane based adhesive 3M tm Scotch-Weld tm DP-605 NS is from 3M (St. Paul, Minn.). EPON® Resin 828, a 2-part epoxy, was used with EPICURE® 3140 curing agent, both available from Miller Stephenson Chemical Co Inc. 1-palmitoyl-2-oleoyl-sn glycero-3-[phospho-L-serine (POPS) and 1-palmitoyl-2-oleoyl-sn-glycero-3 phosphoethanolamine (POPE) are available from Avanti Polar Lipids (Alabaster. Ala.) and dissolved in reagent grade n-decane. HEPES, NMDGCI, KCl, NaCl, gramicidin D, valinomycin and ATP are available from Sigma (St Louis, Mo.). SCH28080 was provided as a gift from Schering Corporation. Compound B (2-(3,4-dimethyphenyl)-3-[2-(4-methoxyphenyl)ethyl]-thiazolidin4-one) is available from Procter and Gamble Pharmaceuticals (Cincinnati, Ohio) and may be prepared as outlined in U.S. Pat. No. 6,174,908. Ag/AgCl reference electrodes are available from World Precision Instruments, Inc (Sarasota, Fla.).

Results

Membrane Characterization and Assays of Lipid Bilayer Formation.

Figure 1:
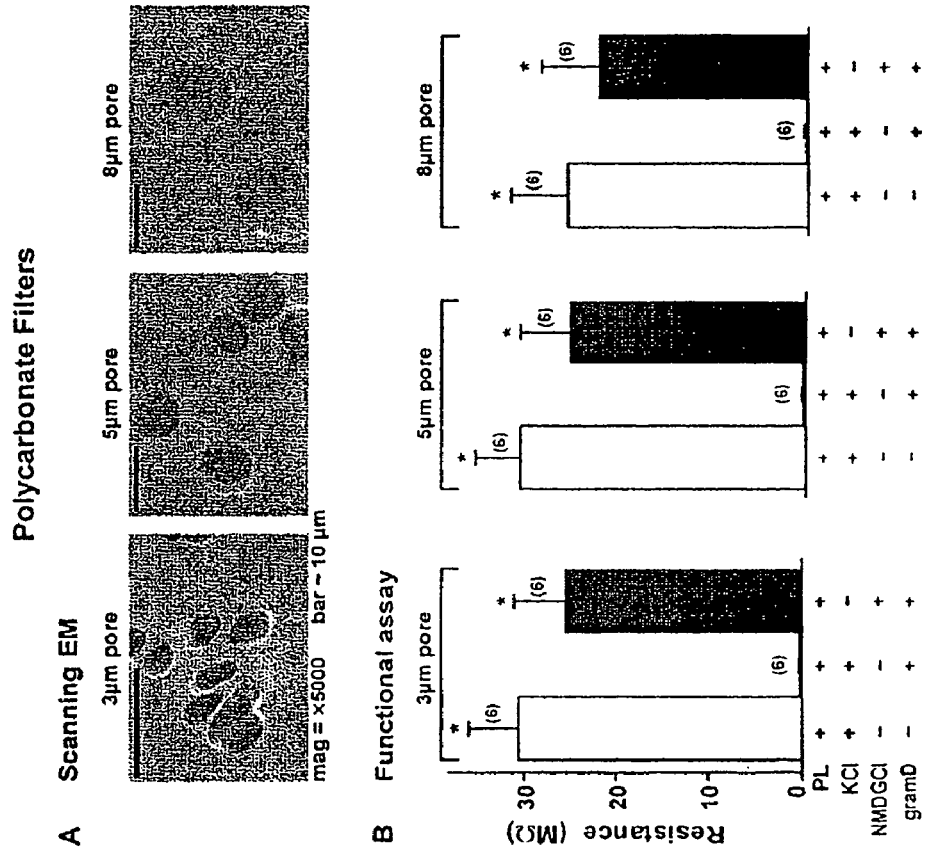
FIG. 1. Scanning electron micrographs (A) and functional assays (B) of polycarbonate filters with 3 different pore sizes. Porous polycarbonate filters with 3, 5 and 8 μm pore sizes were used.

Scanning electron microscope studies of the porous PC filters comprising 3, 5 and 8 μm pores are carried out and the micrographs are set forth in FIG. 1A. A lipid bilayer is formed on the PC filters using 3:1 POPS:POPE (40 mg/ml) as described in the Methods. Bilayer formation is assayed (FIG. 1B) by measuring resistance across the filters after adding phospholipids (PL) without or with gramicidin D (gramD). These assays are carried out in the presence of KCl (permeant cation) or NMDGCl (impermeant cation). The medium is 100 mM KCl or NMDGCl with 10 mM HEPES (pH 7.4). Gramicidin D allows ion conduction through the lipid bilayer only if the phospholipids are a single bilayer thick (Nikolelis et al. Talanta. 39 (1992) 1045-1049) and two gramicidin monomers align to form an ion channel. Similar resistances of 30.66±5.29 (n=6), 31.02±4.92 (n=6) and 26.21±6.25 (n=6) MΩ are measured after bilayer formation in the presence of KCl using PC filters comprising 3, 5 and 8 μm pores respectively. Irrespective of pore size, gramicidin D reduces the resistance significantly (P<0.005) to virtually zero in the presence of K$^+$, a permeant cation, but not in the presence of NMDG$^+$, an impermeant cation. This indicates that phospholipid bilayers are successfully formed on PC filters comprising 3, 5 and 8 μm pores, and that gramicidin D channels are successfully incorporated into the bilayer.

FIGS. 5A and 5B set forth scanning electron micrographs of 9 μm thick PETE membranes comprising 3 μm pores with an average pore density of 2×10.6 6 pores/cm$^2$. FIG. 5C illustrates that PETE membranes with phospholipids had a high resistance of 39.25±0.75 (n=6) MΩ, which decreased significantly (P<0.001) to 5.41±1.11 (n=5) MΩ with gramicidin D and KCl, but did not change with gramicidin D and NMDGCl. Hence, as with PC membranes, phospholipid bilayers and gramicidin D channels are also successfully formed on PETE membranes.

PLLA membranes are synthesized as described in the Methods. X-ray photoelectron spectroscopic (XPS) scans and scanning electron micrographs (as insets) are shown in FIG. 6A. High resolution XPS scans are obtained at 35.75 eV pass energy and are corrected for charge by assigning a value of 284.6 eV to the C (is) peak. The unleached PLLA membrane show peaks at 284.6 eV and 531 eV indicating the presence of carbon [C(1s)] and oxygen [O(1s)] respectively, and two further oxygen Auger peaks at 743.50 eV [O(2s)] and 993.50 eV [O93s)] are also evident. Sodium (1074 eV) and chlorine (200 eV) are present only in the unleached membrane due to NaCl particles. After leaching the membrane with water, sodium and chlorine disappear from the XPS scan indicating that NaCl particles are dissolved away, leaving a pore. This is supported by the images obtained with scanning electron microscopy before and after leaching NaCl particles out of the PLLA membrane (FIG. 6A insets). The unleached PLLA membrane appear to contain a NaCl particle, while the leached PLLA membrane shows pores in place of the NaCl particles. The pore shapes vary from being triangular and rectangular to being nearly circular. The resistance across the unleached and leached PLLA membranes in the absence of phospholipids and in KCl medium is then measured and is set forth in FIG. 6B. The resistance of leached PLLA membranes (0.19±0.004, n=3) MΩ is significantly lower (P<0.02) than that of unleached PLLA membranes (0.95±0.16, n=3) MΩ, indicating that pores are formed. The assay of bilayer formation is performed using leached porous PLLA membranes (FIG. 6B). Resistance of the PLLA membrane increases after adding phospholipids to 11.38±1.65 (n=6) MΩ. On addition of gramicidin D, the resistance decreases significantly (P<0.002) to 0.23±0.15 (n=6) MΩ in the presence of $K^+$ and is unaffected in the presence of $NMDG^+$. These results indicate that phospholipid bilayers are formed on PLLA membranes, and that channel forming gramicidin D is successfully incorporated into the lipid bilayer. Resistance of phospholipid-coated PLLA membranes is significantly lower than that of phospholipid-coated PC comprising 3, 5 and 8 μm pores (P<0.0i, P<0.01, P<0.05) and PETE (P<0.001) membranes. This perhaps is due to the irregular shape and size of the pores in the PLLA membranes. Commercially available PC and PETE membranes have pores that are regular in size and have uniform structure.

Reconstitution of Functional Kv1.5 $K^+$ Channels in Phospholipid Bilayers Foamed in 50 μm Holes in a Plastic Plate and Pores in PLLA Membranes.

The ability to reconstitute ion channels in phospholipid-coated 10-100 μm holes which are laser drilled into the wells of a 96-well plastic plate, one hole/well is investigated. The range of hole/pore sizes is examined and only 50 μm and smaller pores are able to support POPS:POPE phospholipid bilayers that are stable up to 4 hrs. 50 μm holes are therefore used in these experiments. Plasma membrane vesicles from $Lkt^+$ cells transfected with Kv1.5 cDNA and induced with dexamethasone are used. Lipid bilayers are first formed in the 50 μm holes/pores and then vesicles containing Kv1.5 $K^+$ channels are added to the lipid coated wells as described in the Methods. Currents across the bilayers are measured at different holding potentials (+70 mV to −80 mV) with 100 mM KCl/20 mM HEPES (pH 7.4) on both sides of the bilayer. Typical current recordings are illustrated in FIG. 7A together with current-voltage (I-V) curves and a summary of data obtained from a number of experiments. Before bilayer formation there are large, measurable currents which are virtually eliminated upon formation of the phospholipid bilayer. After addition of the vesicles containing Kv1.5 $K^+$ channels, a large current is measured which is inhibited by 1 μM compound B, a Kv1.5 $K^+$ channel inhibitor (disclosed in U.S. Pat. No. 6,174,908). The large currents measured before bilayer formation and after Kv1.5 $K^+$ channel-containing vesicles are added are highly significantly (P<0.001) different from the very low currents measured with PL alone and with PL+Kv1.5 vesicles+1 μM compound B. FIG. 7B illustrates control experiments using plasma membrane vesicles isolated from Lkt cells transfected with Kv1.5 cDNA, but not induced with dexamethasone and therefore without Kv1.5 $K^+$ channels (−Kv1.5 vesicles); boiled membrane vesicles containing Kv1.5 $K^+$ channels (from dexamethasone-induced Lkt cells) and gramicidin D (gramD) reconstituted into the lipid bilayer. Typical currents obtained are shown as well as a summary of current measurements at +70 mv from a number of experiments. When Kv1.5 $K^+$ channels are not present in the membrane vesicles, no currents are evident as is also the case when boiled vesicles containing Kv1.5 $K^+$ channels are used. Large currents (about 30 μVA) are measured with gramicidin D in KCl medium as expected. The findings set forth in FIGS. 7A &B indicate that the measured $K^+$ currents are mediated by Kv1.5 channels and therefore functional Kv1.5 $K^+$ channels are successfully reconstituted into bilayers formed in 50 μm laser-drilled holes in a 96-well plastic plate.

In order to further investigate the reconstitution of Kv1.5 $K^+$ channels in functional form, phospholipid-coated porous PLLA membranes are used (FIG. 7C). With phospholipids alone the resistance is 7.39±0.63 (n=8) MΩ, and following addition of membrane vesicles containing Kv1.5 $K^+$ channels, the resistance decreases significantly (P<0.001) to 0.55±0.15 (n=8) MΩ in the presence of KCl. 1 μM compound B significantly (P<0.001) partially inhibits this decrease resulting in a resistance of 4.13±0.52 (n=8) MΩ. These findings indicate that Kv1.5 $K^+$ channels are incorporated into the bilayer formed in porous PLLA membranes and are functional resulting in compound B-inhibitable $K^+$ currents.

Effect of Varying Inhibitor Compound B on the Reconstituted Kv1.5-Mediated $K^+$ Current To further support the view that Kv1.5 $K^+$ channels are reconstituted in functional form into bilayers formed in 50 μm laser-drilled holes in a 96-well plastic plate, the effect of increasing concentrations of compound B on Kv1.5 $K^+$ currents is measured. FIG. 8A shows the effect of 200 nM and 500 nM compound B on the I-V curve. The control I-V curve in the absence of compound B is linear 200 nM and 500 nM compound B inhibited Kv1.5 $K^+$ channel currents, such that the I-V curve, appear to be rectified at both positive and negative holding potentials suggesting both inside-out and outside-in orientation of the membranes as previously observed (Matsuno, et al. Biochem. Biophys. Acta 1665 (2004) 184-190). In FIG. 8B, the effect of compound B is shown plotted as a dose-response curve with Kv1.5-mediated $K^+$ currents expressed as ΔI at 70 mV as % maximum. The data are fit by a sigmoidal plot with $IC_{50}$=170±40 nM (n=6) and $x^2$=35, P<0.001. This $IC_{50}$ for compound B was similar to that measured in whole cell patch clamp experiments (Matsuno, et al. Biochem. Biophys. Acta 1665 (2004) 184-190), indicating not only that the reconstituted Kv1.5 $K^+$ channels are functional, but that they maintain their sensitivity to compound B.

Reconstitution of $H^+$ Transport by the Gastric H/K ATPase in Phospholipids-Coated PC Filters Comprising 0.4 μm Pores.

To examine whether other membrane transport proteins could be functionally reconstituted in porous (0.4 μm) PC filter-supported lipid bilayers, gastric H/K ATPase-containing membrane vesicles were used. Gastric membrane vesicles are well characterized and known to contain $K^+$ and Cl channels together with the H/K ATPase (Cuppoletti, et al. J. Biol. Chem. 259 (1984) 14952-14959, Malinowska et al. Am. J. Physiol. Cell Physiol. 268 (1995) C191-C200, Malinowska et al. Am. J. Physiol. Cell Physiol. 286 (2004) C495-C506). Resistance measurements are carried out in different salt solutions after addition of hog gastric membrane vesicles to the bilayer (FIG. 9A). The resistance is similar and significantly (P<0.05) reduced in KCl, NMDGCl and NaCl solutions compared to K-gluconate solutions suggesting that active/open Cl channels are incorporated into the bilayer. $H^+$ transport is then measured. FIG. 9B shows a representative experiment in which the $H^+$ concentration of the medium in the outer well bathing the phospholipid-coated PC filter is measured after addition of hog gastric H/K ATPase-containing membrane vesicles to the bilayer. Outer well medium is 10 mM KCl and inner well medium is 100 mM KCl/10 mM HEPES, pH 7.4, 5 mM MgATP and 100 µg/ml valinomycin are then added to the medium in the inner well. After a small initial decrease in $H^+$ concentration, acidification (increase in $[H^+]$) of the outer well medium is observed. 100 µM SCH28080, a specific H/K ATPase inhibitor (Wallmark et al. J. Biol. Chem. 262 (1987) 2077-2084), blocks acidification and results in a decrease in $[H^+]$. FIG. 9C shows a summary of the rate of acidification following reconstitution of hog and rabbit gastric H/K ATPase-containing membrane vesicles into the phospholipid-coated PC filters. The effect of 100 µM SCH28080 is also shown. SCH28080 significantly reduces $H^+$ flux in hog (P<0.05) and rabbit (P<0.02) gastric vesicles. Thus $H^+$ transport that is inhibited by the specific gastric H/K ATPase inhibitor, SCH28080, is evident using hog and rabbit gastric membrane vesicles indicating successful functional reconstitution of the H/K ATPase and associated proteins into the lipid bilayer formed in the 0.4 µm pores of the PC filter.

Phospholipid bilayers made with exemplary porous membranes (PC, PETE, PLLA) result in resistances across the membranes, indicating formation of good seals in the pores of the membranes by the phospholipids and suggesting successful formation of micro lipid bilayers in the pores. The drop in resistance upon addition of gramicidin D in the presence of a permeant cation $K^+$ shows that gramicidin D forms ion channels in the bilayer enabling $K^+$ ions to flow across the bilayer and reduce the resistance. Since gramicidin D channels are formed, the phospholipids must be a single bilayer thick (Nikolelis et al. Talanta. 39 (1992) 1045-1049) in at least some regions. When the impermeant cation $NMDG^+$ is present instead of $K^+$ together with gramicidin D the resistance does not change, demonstrating the ion selectivity of gramicidin D ion channels, which also do not allow passage of $NMDG^+$ or $Cl^-$. This demonstrates that lipid bilayer formation is successful with Millipore polycarbonate membranes comprising pore sizes between 3-8 µm and having an average thickness of 10-12 µm, PETE track-etched membranes with pore size of 3 µm and nominal thickness of 9 µm, and using porous PLLA membranes comprising pore sizes between 3-8 µm and a thickness of 10-15 µm. Gramicidin D and amphotericin B have been previously used to test for bilayer formation and stability by measuring currents or resistance changes (Thompson et al. Anal. Chem. 54 (1982) 76-81, Pantoja, et al. Biophys. J. 81(2001) 2389-2394), although cationic selectivity of these compounds has not previously been tested.

Lipid bilayers also readily form in 50 µm pores drilled in the wells of a 96-well plastic plate as measured by loss of currents upon bilayer formation. Kv1.5 $K^+$ channels are successfully functionally reconstituted in this bilayer as measured by $K^+$ currents, which are capable of being inhibited by the Kv1.5 $K^+$ channel inhibitor, compound B. The fact that there are no measurable currents using vesicles without Kv1.5 $K^+$ channels, or vesicles with Kv1.5 $K^+$ channels that have been boiled, indicates that the $K^+$ currents are Kv1.5 $K^+$ channel-mediated. Gramicidin D-mediated $K^+$ currents are also measured across the bilayers in the 50 µm pores of the 96-well plate. Compound B-inhibitable Kv1.5 $K^+$ channels are also reconstituted in bilayers formed in porous PLLA membranes as measured by resistance changes, although these changes are smaller than those measured using PC or PETE membranes. This may be due to the fact that PLLA pores are less uniform and more varied in shape. Therefore, it is possible that the lipid bilayers are less tightly sealed in each pore.

In addition to reconstitution of gramicidin D and Kv1.5 $K^+$ channels, the gastric H/K ATPase is also successfully reconstituted in bilayers using polycarbonate filters with 0.4 µm pores as measured by SCH28080-inhibitable acidification. Both hog and rabbit H/K ATPase-containing gastric vesicles are reconstituted.

An important component of these methods is the availability of an inhibitor of the transport protein being reconstituted. This is essential to establish that one is measuring function of the reconstituted protein per se (not a bilayer process and not an artifact) and that the reconstituted protein is functional.

What is claimed:

1. A method of making a biological synthetic composite (BSC) membrane comprising at least one functional reconstituted membrane transport protein, the method comprising:
   a) forming a functional lipid bilayer on a porous support selected from the group consisting of polyethyleneterephthalate (PETE), polycarbonate (PC), poly-L-lactic acid (PLLA), a plastic plate comprising a plurality of wells, each well comprising at least one laser-drilled pore, and combinations thereof, such that the functional lipid bilayer forms directly across holes of the pores of the porous support;
   b) confirming existence of the functional lipid bilayer on the porous support;
   c) reconstituting a membrane transport protein into the functional lipid bilayer; and
   d) confirming existence of the reconstituted membrane transport protein, whereby both sides of the functional lipid bilayer are accessible and whereby the functional lipid bilayer supports the function of the membrane transport protein.

2. The method according to claim 1, wherein confirming existence of the functional lipid bilayer comprises measuring resistance across the membrane in the presence and absence of gramicidin D in a medium containing a gramicidin-D permeable cation, wherein existence of the functional lipid bilayer is confirmed if reconstitution of gramicidin D in the lipid bilayer is successful such that a decrease in resistance in a medium containing the gramicidin-D permeable cation results.

3. The method according to claim 1, wherein the membrane transport protein is a Kv1.5 $K^+$ ion channel protein.

4. The method according to claim 3, wherein the porous support comprises a multi-well plastic plate comprising laser-drilled pores, one per well, wherein the pores have a diameter measuring less than about 50 µm.

5. The method according to claim 3, wherein the porous support comprises a poly 1-lactic acid (PLLA) membrane.

6. The method according to claim 3, wherein existence of the reconstituted membrane protein is confirmed by measuring $K^+$ current across the lipid bilayer before and after addition of vesicles comprising a Kv1.5 $K^+$ channel inhibitor.

7. The method according to claim 6, wherein the Kv1.5 $K^+$ channel inhibitor comprises 2-(3,4-dimethyphenyl)-3-[2-(4-methoxyphenyl)ethyl]-thiazolidin4-one.

8. The method according to claim 1, wherein the membrane transport protein comprises a proton pump comprising H/K ATPase.

9. The method according to claim 8, wherein the porous support comprises a polycarbonate (PC) filter.

10. The method according to claim 9, wherein existence of the reconstituted membrane protein is confirmed by monitoring $H^+$ transport across the lipid bilayer before and after addition of an H/K ATPase inhibitor.

11. The method according to claim 10, wherein the H/K ATPase inhibitor comprises SCH28080.

12. The method according to claim 10, wherein monitoring $H^+$ transport comprises measuring an acidification rate.

13. The method according to claim 1, wherein the membrane transport protein is selected from the group consisting of gastric HCl transport system, H/K ATPase, $K^+$ channel, $Cl^-$ channel, Na/K ATPase, membrane transport proteins operable to establish H, K, Na, and $Ca^{2+}$ gradients, and combinations thereof.

* * * * *